Jan. 31, 1967     B. W. KING, JR., ETAL     3,301,711
AL-SI-MN-LI ANODE FOR HIGH TEMPERATURE GALVANIC CELL
Filed Sept. 25, 1964
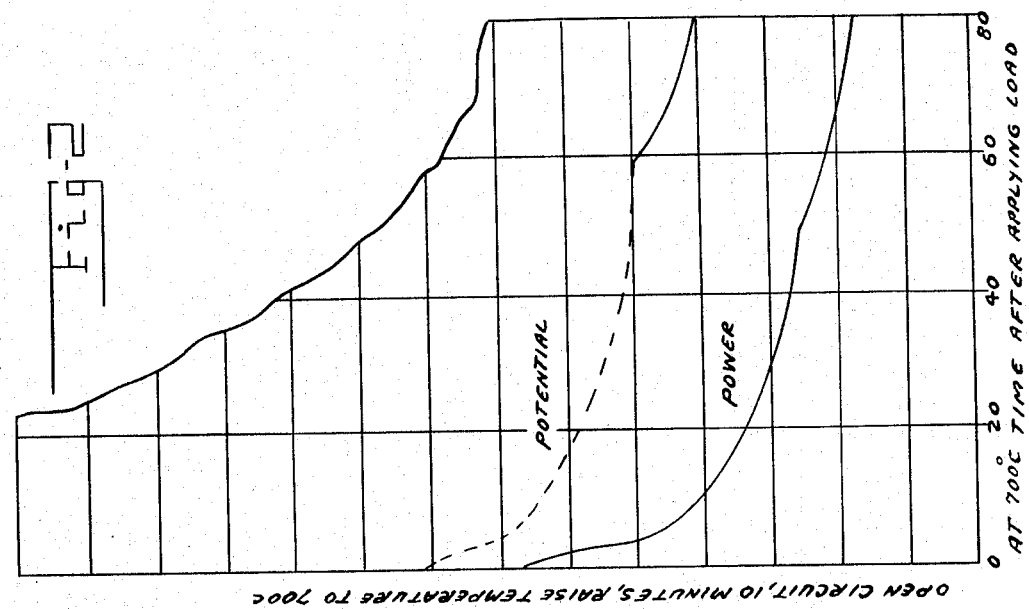
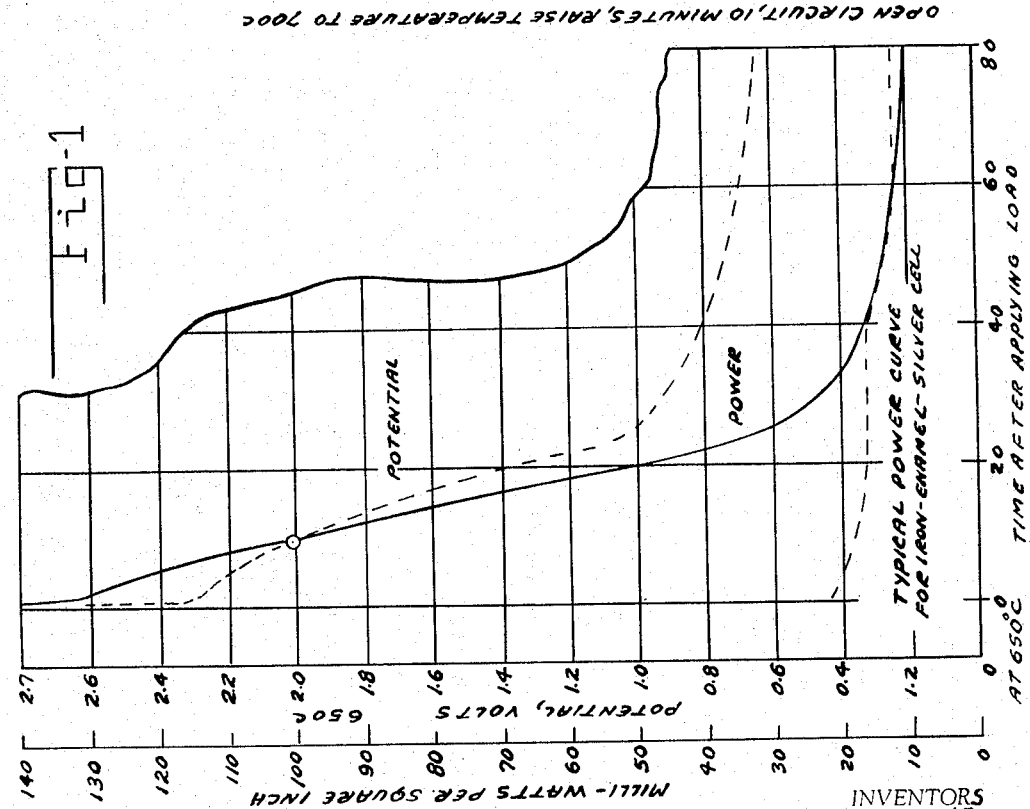
INVENTORS
BURNHAM W. KING, JR.
THOMAS G. BYRER
WALTER A. HEDDEN
BY
ATTORNEYS

United States Patent Office 3,301,711
Patented Jan. 31, 1967

3,301,711
Al-Si-Mn-Li ANODE FOR HIGH TEMPERATURE GALVANIC CELL
Burnham W. King, Jr., and Thomas G. Byrer, Columbus, and Walter A. Hedden, Worthington, Ohio, assignors, by mesne assignments, to the United States of America as represented by the Secretary of the Air Force
Filed Sept. 25, 1964, Ser. No. 399,414
2 Claims. (Cl. 136—120)

This invention relates to a high temperature galvanic cell anode and to the method by which it is made.

The object of the present invention is a provision of a new and improved galvanic cell that operates successfully at temperatures in the order of 650° C. to 700° C., which on the Fahrenheit scale are 1202° to 1292° F. respectively.

In general, a high temperature galvanic cell or battery consists of solid metal electrodes and a ceramic as an electrolyte. An iron-enamel-silver Austin cell consists of a silver cathode separated from an iron anode by a glass electrolyte. In this type of galvanic cell, oxides in the glass appear to function as the current carrying electrolyte, with electrical power produced by the oxidation of the iron anode and with the voltage depending greatly on the particular metallic composition of the anode.

For high electrical output from the galvanic cell, it is desirable that the cell anode should be of a high melting point metal composition and of a high free energy of oxidation. The metals in the anode must have melting points that are sufficiently high to avoid slumping at the temperature at which a desired electrolyte is applied to the anode. This characteristic was confirmed experimentally by the preparation of several metal anode compositions. The performance of one of the compositions as an anode in a high temperature galvanic cell, was evaluated as illustrated in the accompanying drawing.

In the accompanying drawing:

FIG. 1 presents experimental results derived from an anode of the composition in melt number 6 described hereinafter at 650° C., compared with comparable results from an Austin cell at 650° C.; and FIG. 2 presents corresponding results at 700° C.

Each of the anode compositions that were prepared possesses a significant content of metals that impart a high free energy of oxidation to the anode alloy of aluminum, silcon, manganese and lithium metals.

The following table presents prepared heats of Al-Si-Mn-Li metal compositions with melting points above 1400° F., which corresponds to 760° C.

| Charged Metal | Ratio of Charged Amounts by Weight in Heats Numbered | | | | | |
|---|---|---|---|---|---|---|
| | 4 | 5 | 6 | 7 | 8 | Range |
| Al | 74 | 82 | 74 | 72 | 72 | 72–84 |
| Si | 4 | 4 | 3 | 4 | 4 | 3–4 |
| Mn | 20 | 10 | 20 | 20 | 20 | 10–20 |
| Li | 4 | 4 | *3 | *4 | 4 | 3–4 |

*Plus additional 5 parts of Li to make up for losses during degassing

All of the heats were prepared in a clay graphite crucible.

The heats numbered 4 and 5 were prepared by melting the charged aluminum, adding the silicon at 871° C. or 1600° F. and stirring the melt. The manganese was added at 1038° C. or 1900° F. as the stirring of the melt was continued and the temperature was increased as the lithium was added. The melt was poured into a mold that formed the anodes. The melting point of the anode from heat number 4 was about 1580° F. or 860° C. The composition of the anode from heat number 5 slumped at 1475° F. or 802° C.

The heats numbered 6 and 7 were prepared by melting the aluminum at 660° C. or 1220° F. The temperature was increased and when it reached 871° C. or 1600° F. the silicon was added and the melt was stirred. At the temperature 1038° C. or 1900° F. the manganese was added with continued stirring. At the temperature 1038° C., the melt was fluxed for 6 minutes using chlorine gas, and the lithium was added. The fluxing with chlorine gas was continued after the lithium was added, and then the melt was skimmed and poured into the mold producing the anode.

The heat number 8 was prepared by first melting the aluminum at 660° C. The silicon was added to the molten aluminum at 927° C. or 1700° F., with stirring. The manganese was added at 1038° C., with stirring, and with fluxing for 6 minutes, using chlorine gas. The temperature was maintained at 1038° C. while the lithium was added with stirring. The melt was then skimmed and was poured into the mold to form the anode.

*Example 1*

The anode metal composition of heat number 6, coated with a selected enamel electrolyte and fired in a nitrogen-rich atmosphere, may be taken as a successfully operating embodiment of the present invention. Silver was applied to a 2.1 square inch area of the enameled surface, to complete the galvanic cell submitted to test.

The galvanic cell so made was heated to 650° C. and, on open circuit a potential of 2.62 volts was measured, as indicated at the time zero along the ordinate of FIG. 1 of the accompanying drawing.

This cell had a high power output at 650° C. of about 150 mw. per square inch for the first minute. The initial power output decreased from the 134 mw. per square inch to about 50 mw. per square inch after 20 minutes of operation. The power output was measured using a resistance load of 19 ohms, which is equivalent to a load of 10 ohms on a 4 square inch area.

For a comparison with this experimentally confirmed performance of the anode that is disclosed herein, the typical power curve for the iron-enamel-silver cell is shown near the bottom of the graph in FIG. 1 of the accompanying drawing.

The cell was operated at 650° C. for 80 minutes after which the load was disconnected and the temperature of the cell was increased to 700° C.

The same resistance load was again applied and the power output was measured for a period of 90 minutes.

The results obtained at both 650° C. and at 700° C., in comparable juxtaposition are shown in FIGS. 1 and 2 of the accompanying drawings.

It is to be understood that the composition of the anode and its method of manufacture, that are disclosed herein as a separate article as well as a part of its cell, are submitted as being illustrative embodiments of the present invention and that equivalent modifications may be made therein without departing from the spirit and the scope of the present invention.

We claim:
1. A high temperature galvanic cell comprising an anode having a composition consisting of about 74 percent aluminum, 20 percent Mn, 3 percent Si and 3 percent Li.
2. A high temperature galvanic cell comprising an anode having a composition consisting of the following ranges in weight percent:

| | Percent |
|---|---|
| Al | 72–84 |
| Si | 3–4 |
| Mn | 10–20 |
| Li | 3–4 |

References Cited by the Examiner

UNITED STATES PATENTS

| | | | |
|---|---|---|---|
| 358,031 | 2/1887 | Frishmuth | 136—120 |
| 1,117,308 | 11/1914 | Bayliss et al. | 75—146 |
| 1,578,857 | 3/1926 | Siegmund et al. | 75—148 |
| 1,595,218 | 8/1926 | Pacz | 75—148 |
| 1,620,081 | 3/1927 | Czochralski et al. | 75—138 |
| 2,104,973 | 1/1938 | Dassler | 136—120 |
| 2,108,085 | 2/1938 | Stroup | 75—146 |
| 2,219,095 | 10/1940 | Schuttler | 75—138 |
| 2,296,866 | 9/1942 | Moss | 75—138 |
| 3,190,750 | 6/1955 | Staggers et al. | 75—138 |

WINSTON A. DOUGLAS, *Primary Examiner.*

A. SKAPARS, *Assistant Examiner.*